(Model.)
F. L. HARRIS.
MANUFACTURE OF FERTILIZING MATERIAL.
No. 259,140. Patented June 6, 1882.
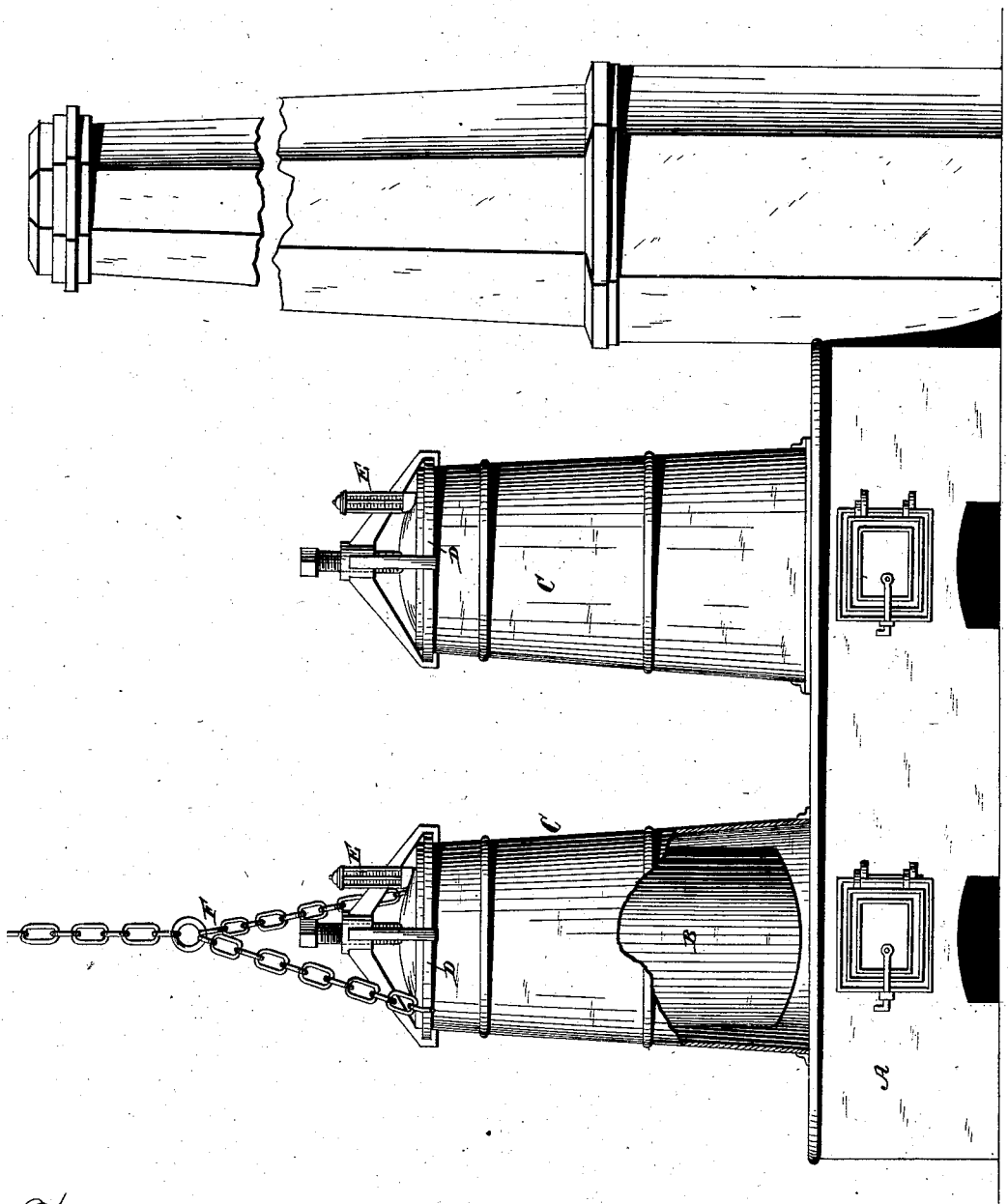
Witnesses:
Jas. E. Hutchinson.
J. A. Rutherford
Inventor,
Frank L. Harris,
By his Attorney,
James L. Norris

UNITED STATES PATENT OFFICE.

FRANK L. HARRIS, OF HARRISONBURG, VIRGINIA.

MANUFACTURE OF FERTILIZING MATERIAL.

SPECIFICATION forming part of Letters Patent No. 259,140, dated June 6, 1882.

Application filed January 19, 1882. (Specimens.)

*To all whom it may concern:*

Be it known that I, FRANK L. HARRIS, a citizen of the United States, residing at Harrisonburg, in the county of Rockingham and State of Virginia, have invented new and useful Improvements in the Manufacture of Fertilizing Materials, of which the following is a specification.

This invention relates to the treatment of animal bones, horns, or hoofs, or of marine shells, to render the same efficient as a manure or fertilizer.

Bones which contain about one-third animal matter furnish carbonic acid and ammonia by the putrefaction of their gelatinous substance, as well as a large supply of phosphate of lime, and hence are very desirable as a manure. Horns and hoofs which contain considerable nitrogen are also serviceable for the same purpose; but in either boiling, superheating by steam, or calcining bones and the like these animal products are all extracted or consumed, and hence the value of the article as a manure or fertilizer is greatly impaired. Under my present invention, however, I so treat the bone, horn, or hoof, that while the article after being treated will present somewhat the appearance of having been superheated by steam or calcining in the usual way and can be ground up as finely as may be desired, it will be found to have retained all, or nearly all, of the gelatinous matter found in the bone before such treatment. To this end I subject the bone, horn, or hoof to pressure while immersed in water heated above the boiling-point for a required length of time, which will be, say, until the water has reached the temperature of about 250° or 300° Fahrenheit, the said pressure being produced by thus heating the water in which the bones are immersed while confined in an air-tight vessel. I then remove the bone thus treated and allow the same to dry. The water is allowed to remain in the vessel and a fresh charge of bone introduced into the same water, and the operation repeated. After a succession of these operations the water is drawn off and the dried bone allowed to soak in the water thus enriched with gelatine until the bone has absorbed pretty much all of the latter. The bone is then again dried, after which it is pulverized, ready for the market.

I have found by experiment that by thus subjecting the bone or the like to such pressure in water heated as stated that but a small per cent. of the animal matter will be extracted from the bone, &c., whereas in ordinary steaming about all of the gelatinous matter will be taken therefrom, and in calcining the nitrogenous substances are entirely consumed.

The bone prepared under my invention will be found to contain the greater part of the original animal matter, and when ground will readily be distinguished from the ground calcined or superheated bone by its dark color and rich odor, the superheated or calcined bone having but comparatively little of these properties.

Such gelatine as may be extracted from the bone during my process can be utilized in a very simple way, and to such end after a charge of the bones, horn, or hoof has been treated according to my invention and then removed from the vessel or retort in which the article has been thus treated a fresh charge of bone, &c., can be introduced into the same water and subjected to pressure, as before. In such second instance less gelatine will be extracted, and, in fact, the bone, &c., will, on the contrary, be somewhat enriched by becoming impregnated with the gelatine remaining in the water. In order to save the gelatine remaining in the water after completion of a succession of these operations, the water can be drawn off and the bones, &c., when dried, be soaked in the same, so as to reabsorb all of the gelatine contained therein, the bones, &c., being in such case sufficiently porous to absorb the gelatine.

The above product can then be finely ground up, and will form a rich nitrogenous fertilizer, which is readily soluble, and hence will constitute an immediate food for the plants.

Marine shells also lose many of their component parts by calcining; but by treating them according to my invention the same will be found to be preserved, and at the same time the shells will after treatment present the appearance of ordinary calcined shells, and will be soft and readily crumble.

The product which I obtain will serve as a rich food for crops, and has, among other advantages, the one that the bones, &c., can be treated soon after they have been taken from the animal, while they are rich with gluten and covered with blood, it being well known that bones which have been exposed for some time to atmospheric influences part with a large proportion of nitrogen, and hence are not so serviceable.

In the drawing, which shows a convenient construction of apparatus for carrying out my invention, A indicates the furnace, and B a closed vessel or retort surrounded by a jacket, C, and placed upon the furnace. The retort will have a steam-tight cap or lid, D, and the flame and heat from the furnace will enter the space between the jacket and the retort, so as to rapidly and efficiently heat the latter.

E indicates an ordinary gage to indicate the pressure within the retort, and F a chain that can be connected with a crane for the purpose of lifting the apparatus from the furnace when desired.

The retort will be filled to the proper height with water and the charge introduced into the same, after which the cap or lid will be closed and the retort placed upon the furnace until the water has become heated to about 250° Fahrenheit, after which the apparatus can be lifted from the furnace and the charge removed.

Having thus described my invention, what I claim is—

The herein-described process of producing a fertilizer, consisting in immersing bones, horns, or hoofs in water within an air-tight vessel and while so immersed and confined subjecting the article to pressure by heating the water above the boiling-point, removing and drying the charge and introducing into the same water a fresh charge and treating it in a similar manner, next allowing a quantity of the article thus treated and dried to soak in the water, so as to absorb the gelatine contained therein, and finally drying and pulverizing the article.

In testimony whereof I have hereunto set my hand in the presence of two subscribing witnesses.

FRANK L. HARRIS.

Witnesses:
JAMES L. NORRIS,
JAMES A. RUTHERFORD.